United States Patent
Ebara et al.

(10) Patent No.: US 8,512,206 B2
(45) Date of Patent: Aug. 20, 2013

(54) TRANSMISSION CLUTCH CONTROL DEVICE

(75) Inventors: Tatsuhiko Ebara, Fujisawa (JP); Takao Iijima, Fujisawa (JP); Tomoko Ohta, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 1133 days.

(21) Appl. No.: 12/514,818

(22) PCT Filed: Nov. 13, 2007

(86) PCT No.: PCT/JP2007/071977
§ 371 (c)(1),
(2), (4) Date: May 14, 2009

(87) PCT Pub. No.: WO2008/062690
PCT Pub. Date: May 29, 2008

(65) Prior Publication Data
US 2010/0087291 A1    Apr. 8, 2010

(30) Foreign Application Priority Data
Nov. 24, 2006  (JP) .................................. 2006-317596

(51) Int. Cl.
*B60W 10/02*  (2006.01)

(52) U.S. Cl.
USPC ........................................................ 477/174

(58) Field of Classification Search
None
See application file for complete search history.

(56) References Cited

U.S. PATENT DOCUMENTS
5,853,350 A  * 12/1998 Hasegawa et al. ............ 477/166

FOREIGN PATENT DOCUMENTS
JP    H11-166658 A    6/1999
JP    2002-295673 A   10/2002

OTHER PUBLICATIONS
International Search Report for PCT/JP2007/071977 dated Dec. 11, 2007.

* cited by examiner

*Primary Examiner* — Erin D Bishop
(74) *Attorney, Agent, or Firm* — McCormick, Paulding & Huber LLP

(57) ABSTRACT

A transmission clutch controld evice that can perform adequate connection-disconnection control of a transmission clutch, regardless of disturbances such as variations in battery voltage and temperature variations.

4 Claims, 4 Drawing Sheets

TRANSMISSION CLUTCH CONTROL DEVICE

CROSS REFERENCE TO RELATED APPLICATIONS

This application is entitled to the benefit of and incorporates by reference essential subject matter disclosed in International Patent Application No. PCT/JP2007/071977 filed on Nov. 13, 2007 and Japanese Patent Application No. 2006-317596 filed Nov. 24, 2006.

TECHNICAL FIELD

The present invention relates to a device that controls connection and disconnection of a transmission clutch interposed between an engine and a transmission.

BACKGROUND ART

A power transmission device for a vehicle is known in which a transmission clutch is interposed between an engine and a manual transmission, and the transmission clutch is automatically connected and disconnected when the transmission is shifted as disclosed in Japanese Patent Application Laid-Open No. 2002-295673.

The transmission clutch is disconnected by a control means when the transmission is shifted before the gears are disengaged and connected after the gears are engaged. More specifically, the transmission clutch is operated by a fluid pressure (oil pressure), and a control valve is provided in a pipe supplying the oil pressure to the transmission clutch.

The inventors are currently in the process of developing a transmission clutch control device that employs a linear solenoid valve, in which an opening degree is changed in correspondence with a supplied current value, as the control valve.

DISCLOSURE OF THE INVENTION

The linear solenoid valve has an opening degree corresponding to a value of a real supplied current actually flowing in the linear solenoid valve. Therefore, a transmission clutch cannot be appropriately connection-disconnection controlled when the value of the real supplied current actually flowing in the linear solenoid valve shifts with respect to a target supplied current value instructed from the control means to the linear solenoid valve.

However, it is possible that the real supplied current value will shift with respect to the target supplied current value due to disturbances such as variations in power source voltage (battery voltage) and variations in temperature. When such a shift is large, the transmission clutch can assume a half clutch state when it has to be disconnected and, conversely, the transmission clutch can be disconnected or connected when it has to be in a half clutch state.

As a result, the driver (operator) will feel uncomfortable, friction endurance of the transmission clutch will be degraded, and endurance of transmission components will be degraded (when shifting of the transmission is performed in a half clutch state, although the clutch has to be disconnected, a gear noise is produced).

Accordingly, it is an object of the present invention to provide a transmission clutch control device that can adequately perform connection-disconnection control of a transmission clutch, regardless of disturbances such as variations in battery voltage and variations in temperature.

In order to attain the above-described object, the first invention provides a transmission clutch control device for connection-disconnection control of a transmission clutch interposed between an engine and a transmission and actuated by a fluid pressure, including: a linear solenoid valve that is provided in a pipe for supplying the fluid pressure to the transmission clutch and has an opening degree changing according to a supplied current value; a drive circuit that changes a supplied current value that is supplied to the linear solenoid valve in response to an inputted drive signal; control means for storing a group of target drive signals that are inputted to the drive circuit when the transmission clutch is connected and disconnected; and a sensor that detects a value of a real supplied current flowing in the linear solenoid, wherein the control means has a function of: inputting to the drive circuit a predetermined test drive signal such that a current flowing in the linear solenoid valve assumes a predetermined test current value before the transmission clutch is disconnected for shifting during shifting of the transmission; obtaining a deviation between a value of a real supplied current actually flowing in the linear solenoid valve that is detected by the sensor at this moment and the test current value; correcting the group of target drive signals on the basis of this deviation; performing disconnection control of the transmission clutch by using the corrected group of target drive signals; and performing connection control of the transmission clutch by using the corrected group of target drive signals after gears have been disengaged and engaged.

The test current value is preferably set to a current value at which the transmission clutch maintains the connected state, without assuming a half clutch state.

The second invention provides a transmission clutch control device for connection-disconnection control of a transmission clutch interposed between an engine and a transmission and actuated by a fluid pressure, including a linear solenoid valve that is provided in a pipe for supplying the fluid pressure to the transmission clutch and has an opening degree changing according to a supplied current value; a drive circuit that changes a supplied current value that is supplied to the linear solenoid valve in response to an inputted drive signal; control means for storing a group of target drive signals that are inputted to the drive circuit when the transmission clutch is connected and disconnected; and a sensor that detects a value of a real supplied current flowing in the linear solenoid, wherein the control means has a function of: inputting to the drive circuit a predetermined test drive signal such that a current flowing in the linear solenoid valve assumes a predetermined test current value in a stopped condition of a vehicle; obtaining a deviation between a value of a real supplied current actually flowing in the linear solenoid valve that is detected by the sensor at this moment and the test current value; correcting the group of target drive signals on the basis of this deviation; and performing connection-disconnection control of the transmission clutch by using the corrected group of target drive signals.

The test current value is preferably set to a current value at which the transmission clutch assumes a disconnected state.

With the transmission clutch control device in accordance with the present invention, connection-disconnection control of a transmission clutch can be adequately performed regardless of disturbances such as variations in battery voltage and variations in temperature.

BEST MODE FOR CARRYING OUT THE INVENTION

A preferred embodiment of the present invention will be described below in greater detail with reference to the appended drawings.

Figure 1:
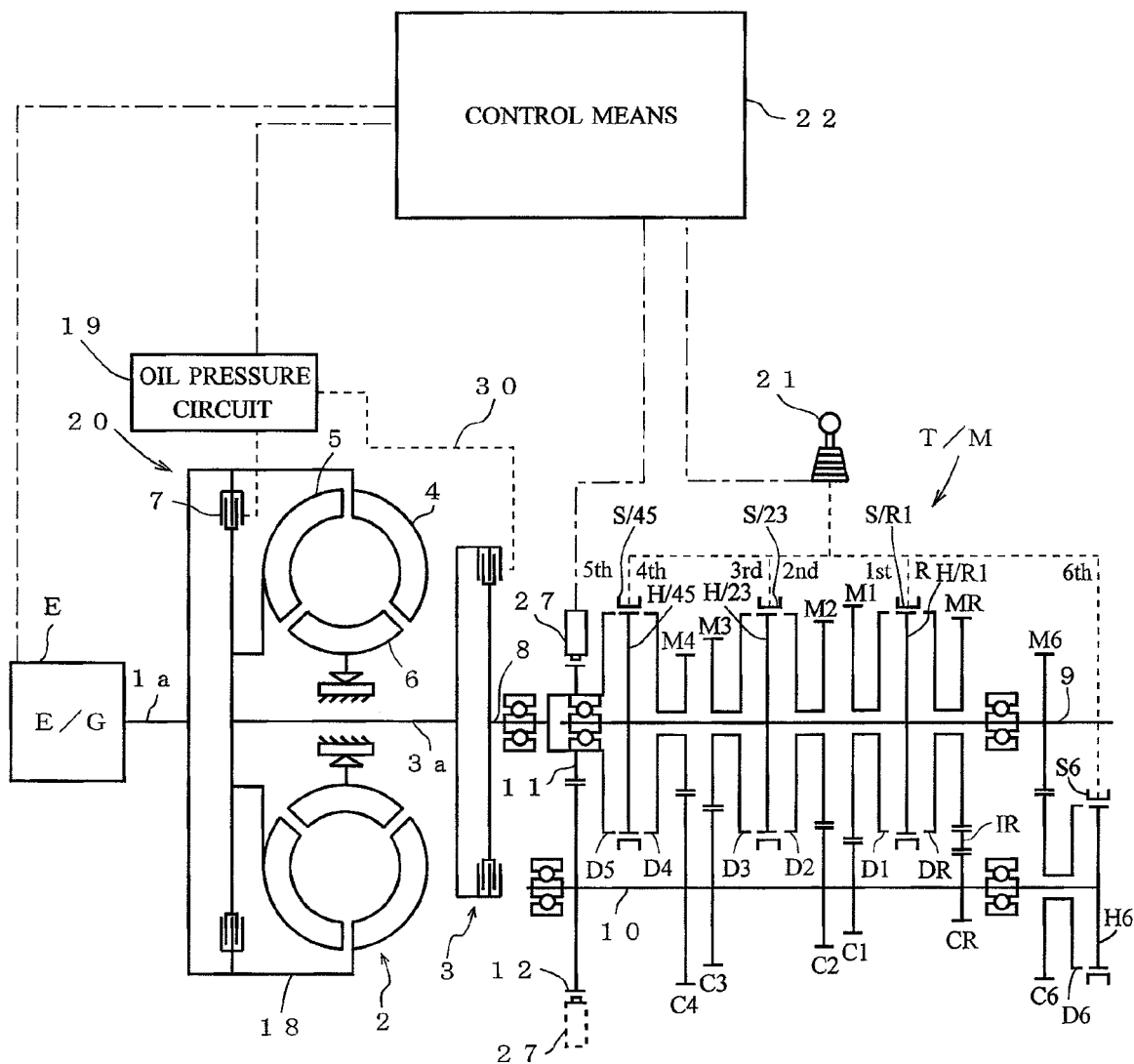
FIG. 1 is a schematic diagram of a power transmission device employing a transmission clutch control device of an embodiment of the present invention.

As shown in FIG. 1, a fluid coupling (torque converter) 2 and a transmission clutch (wet multiplate clutch) 3 are interposed in series between an engine (a diesel engine in the present embodiment) E and a transmission T/M. The fluid coupling 2 is disposed on the side of the engine E, and the transmission clutch 3 is disposed on the side of the transmission T/M.

The fluid coupling 2 generates creep when the vehicle movement is started and the fluid coupling 2 is mainly configured by a pump unit 4 that rotates integrally with a casing 18 connected to an output shaft (crankshaft) 1a of the engine E, a turbine unit 5 disposed opposite the pump unit 4 inside the casing 18 and connected to an input shaft 3a of the transmission clutch 3, and a stator unit 6 interposed between the turbine unit 5 and pump unit 4. The pump unit 4 and the turbine unit 5 are coupled and disconnected by a lockup device 20. The lockup device 20 includes a lockup clutch 7 interposed between the pump unit 4 and the turbine unit 5 and an oil pressure circuit 19 that actuates the lockup clutch 7.

The input shaft 3a of the transmission clutch 3 is connected to the turbine unit 5 of the fluid coupling 2, and an output side of the transmission clutch is connected to an input shaft 8 of the transmission T/M so as to connect and disconnect the fluid coupling 2 and the transmission T/M. When the transmission T/M is shifted, the transmission clutch 3 is disconnected before the gears are disengaged and connected after the gears are engaged. The transmission clutch 3 is biased at all times in the disconnection direction by a spring (not shown in the figure) and connected by an oil pressure from the oil pressure circuit 19. More specifically, in the transmission clutch 3, a plurality of clutch plates (or clutch disks) are alternately splined to the input side and output side inside a clutch casing (not shown in the figure) filled with oil, and the connection and disconnection of the transmission clutch 3 is performed by pressing these clutch plates together or separating them. The transmission clutch 3 may be operated not only by oil pressure, but also a fluid other than oil (for example, water).

The transmission T/M has the input shaft 8 joined to the output side of the transmission clutch 3, the output shaft 9 disposed coaxially with the input shaft 8, and a countershaft 10 disposed parallel to input shaft 8 and output shaft 9 and is of the so-called manual system. An input main gear 11 is provided at the input shaft 8. A first-speed main gear M1, a second-speed main gear M2, a third-speed main gear M3, a fourth-speed main gear M4, and a reverse main gear MR are supported on the output shaft 9, and a sixth-speed gear M6 is fixedly provided thereon. An input auxiliary gear 12 to be meshed with the input main gear 11, a first-speed auxiliary gear C1 to be meshed with the first-speed main gear M1, a second-speed auxiliary gear C2 to be meshed with the second-speed main gear M2, a third-speed auxiliary gear C3 to be meshed with the third-speed main gear M3, a fourth-speed auxiliary gear C4 to be meshed with the fourth-speed main gear M4, and a reverse auxiliary gear CR to be meshed via an idle gear IR with the reverse main gear MR are fixedly provided on the countershaft 10, and a sixth-speed auxiliary gear C6 to be meshed with the sixth-speed main gear M6 is supported thereon.

With such a transmission T/M, where a sleeve S/R1 splined to a hub H/R1 fixed to the output shaft 9 is splined to a dog DR of the reverse main gear MR, the output shaft 9 rotates in reverse, and where the sleeve S/R1 is splined to a dog D1 of the first-speed main gear M1, the output shaft 9 rotates according to the first speed. Where a sleeve S/23 splined with a hub H/23 fixed to the output shaft 9 is splined to a dog D2 of the second-speed main gear M2, the output shaft 9 rotates according to the second speed, and where the sleeve S/23 is splined to a dog D3 of the third-speed main gear M3, the output shaft 9 rotates according to the third speed. Where a sleeve S/45 splined to a hub H/45 fixed to the output shaft 9 is splined to a dog D4 of the fourth-speed main gear M4, the output shaft 9 rotates according to the fourth speed, and where the sleeve S/45 is splined to a dog D5 of the input main gear 11, the output shaft 9 rotates according to the fifth speed (direct connection). Where a sleeve S6 splined to a hub H6 fixed to the countershaft 10 is splined to a dog D6 of the sixth-speed auxiliary gear C6, the output shaft 9 rotates according to the sixth speed.

Each of the sleeves S is operated manually via a shift fork and a shift rod (not shown in the figures) when a driver operates a shift lever 21 located in a driver's cabin (manual transmission mode), or operated automatically when a gear shift actuator (not shown in the figures) actuates the shift fork and shift rod in accordance with the operation state (opening degree of an accelerator pedal, vehicle speed, etc.) of the engine E (manual transmission mode). When the gear level of the transmission T/M is switched by the manual transmission mode or automatic transmission mode, the transmission clutch 3 is disconnected before the gears of the present gear level are disengaged and the transmission clutch 3 is connected after the present gear level is engaged to another gear level.

A rotation sensor 27 that detects the revolution speed of the input shaft 8 of the transmission T/M (transmission input shaft revolution speed) is provided in the vicinity of the input main gear 11 of the transmission T/M or the input auxiliary gear 12 meshed with the input main gear 11, and a detection value of the rotation sensor 27 is inputted to a control means (ECU) 22. The ECU 22 actuates the lockup device 20 (oil pressure circuit 19) of the fluid coupling 2 to a disconnection side and disconnects the lockup clutch 7 when the detection value (transmission input shaft revolution speed) of the rotation sensor 27 is equal to or less than a set value (for example, 800 rpm), and actuates the lockup device 20 (oil pressure circuit 19) to a connection side and connects the lockup clutch 7 when the detection value is equal to or higher than a set value (for example, 1000 rpm).

Figure 2:
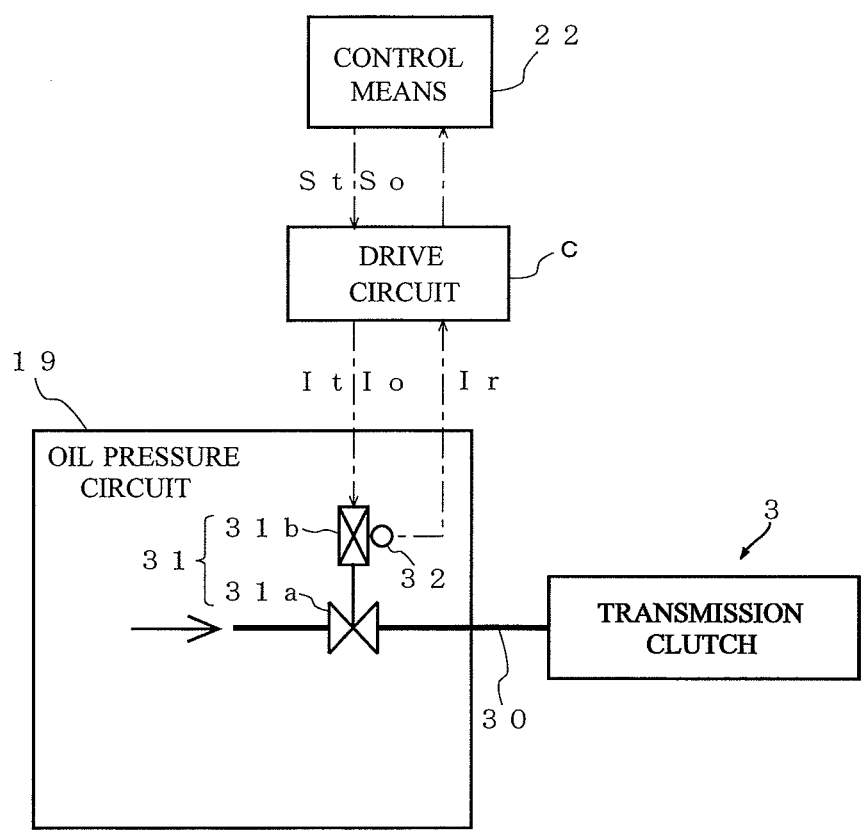
FIG. 2 is an enlarged schematic view of part of the configuration shown in FIG. 1.

As shown in FIG. 2, a pipe 30 for supplying oil pressure to the transmission clutch 3 is connected to the transmission clutch 3. Oil pressure generated by an oil pump (not shown in the figure) driven by the rotation of the crankshaft 1a of the engine E is supplied to the pipe 30. A linear solenoid valve 31 that has an opening degree changing according to a supplied current value is provided at the pipe 30. Where the linear solenoid valve 31 is closed and oil pressure supplied to the transmission clutch 3 via the pipe 30 is cut off, the transmission clutch 3 is disconnected (completely disconnected) by a spring (not shown in the figure). Conversely, where the linear solenoid valve 31 is actuated in the opening direction, the transmission clutch 3 is actuated in the connection direction following the increase in oil pressure supplied to the transmission clutch 3 via the pipe 30 and eventually connected (completely connected) after passing via a half clutch state.

The linear solenoid valve 31 has a valve body 31a that changes a channel surface area of the pipe 30 and a linear solenoid 31b that operates the valve body 31a. The opening degree of the valve body 31a is changed according to a value of current supplied to the linear solenoid 31b. A drive circuit C that changes the supplied current value supplied to the linear solenoid 31b in response to a drive signal inputted from the ECU 22 is connected between the linear solenoid 31b and the ECU (electronic control unit: includes a CPU and corresponds to "control means" described in the claims) 22. A target drive signal So that is inputted to the drive circuit C when the transmission clutch 3 is connected and disconnected is stored in the ECU 22.

More specifically, the ECU 22 stores a map M having written therein a group of target drive signals So corresponding to connection of the transmission clutch 3 from the disconnected state, and when transmission clutch 3 is connected from the disconnected state, the target drive signal So written in the map M is inputted from the ECU 22 to the drive circuit C. The drive circuit C then changes the supplied current value supplied to the linear solenoid 31b in response to the target drive signal So, performs rapid connection of the transmission clutch 3 that is connected from the disconnected state immediately before the clutch reaches a half clutch state from the complete disconnected state, performs smooth connection in the half clutch region, and again performs rapid connection to a complete connected state after completion of the half clutch state.

The map M has also written therein a group of target drive signals So corresponding to disconnection of the transmission clutch 3 from the connected state, and when transmission clutch 3 is disconnected from the connected state, the target drive signal So is inputted from the ECU 22 to the drive circuit C via a drive terminal 40. The drive circuit C then changes the supplied current value supplied to the linear solenoid 31b in response to the target drive signal So and performs rapid disconnection from the complete connected state to the complete disconnected state of the transmission clutch 3 that is disconnected from the connected state.

Figure 3:
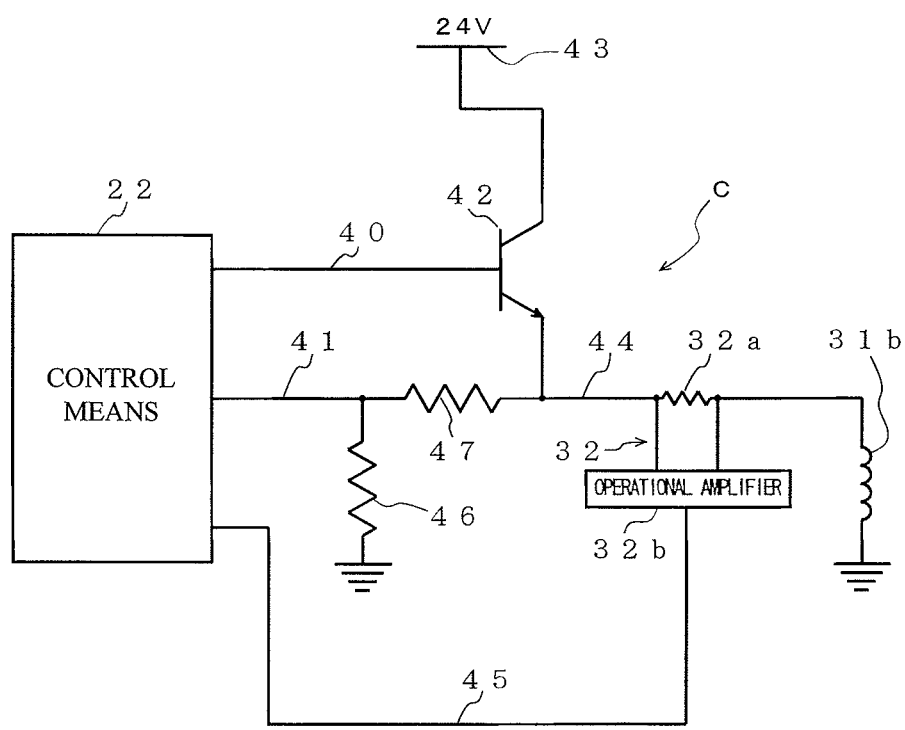
FIG. 3 shows an electric circuit for driving a linear solenoid valve.

FIG. 3 is a schematic diagram of the drive circuit C. The drive terminal 40 and a voltage monitor terminal 41 are connected to the ECU 22, a transistor 42 is connected to the drive terminal 40, a power source (battery 24 V) 43 and an output line 44 are connected to the transistor 42, and the linear solenoid 31b of the linear solenoid valve 31 is connected to the output line 44. The target drive signal So written into the map M stored in the ECU 22 is then inputted from the ECU 22 to the transistor 42 via the drive terminal 40. The transistor 42 repeats the ON/OFF drive at a high rate and supplies a predetermined current value corresponding to the target drive signal So inputted from the ECU 22 to the linear solenoid 31b within a predetermined interval.

A sensor 32 (see FIG. 2) for detecting a real supplied current value Ir that actually flows in the linear solenoid 31b is provided in the output line 44. The sensor 32 is configured by a shunt resistor 32a introduced in the output line 44 and an operational amplifier (for example, with an amplification ratio of 50) 32b connected to both ends of the shunt resistor 32a. The resistance of the shunt resistor 32a is made very small in comparison with that of the linear solenoid 31b to measure accurately a voltage at both ends thereof. A current line 45 for supplying a current value flowing in the shunt resistor 32a to the ECU 22 is connected to the operational amplifier 32b. The reference numerals 46 and 47 in the figure stand for resistors (have the same resistance) for applying a voltage (about 12 V) that is about half the voltage (24 V) of the battery 43 to the voltage monitor terminal 41.

The ECU 22 inputs to the transistor 42 via the drive terminal 40 a predetermined test drive signal St such that a current flowing in the linear solenoid 31b assumes a predetermined test current value It (constant value, for example, 0.4 A) within a predetermined interval (for example, 112 ms) before the transmission clutch 3 is disconnected for shifting each time the transmission T/M is shifted (shift in the automatic transmission mode or manual transmission mode) as the vehicle travels, finds a deviation ε between the real supplied current value Ir of the linear solenoid 31b detected by the sensor 32 at this time and the test current value It, and corrects the group of target drive signals So of the map M on the basis of this deviation ε (correction during shifting). The test current value (0.4 A) It is set to a current value at which the transmission clutch 3 maintains the connected state, without assuming a half clutch state. If the transmission clutch 3 is disconnected and assumes a half clutch state immediately before a shift operation during shifting performed as the vehicle travels, the driver will feel uncomfortable.

The ECU 22 then inputs the target drive signal So corresponding to a complete disconnection of the transmission clutch 3 from among the signals of the map M after the correction into the drive circuit C, performs disconnection control of the transmission clutch 3, disengages the present gear level, performs engaging to the target gear level, then selects the target drive signal So corresponding to a target supplied current value Io (variable that changes depending on time and vehicle state) during connection control of the transmission clutch 3 from among the group of target drive signals So of the map M after the correction, inputs this target drive signal to the drive circuit C, and performs connection control of the transmission clutch 3. The above-described correction of the map M on the basis of the deviation ε and the connection-disconnection control of the transmission clutch 3 that uses the map M after the correction are performed in each connection control cycle of the transmission clutch 3.

Furthermore, in a stopped condition of the vehicle, that is, when the vehicle speed is equal to or less than a predetermined vehicle speed (for example, 5 km/h), the foot brake is actuated, and the shift lever 21 is in a neutral (N) or parked (P) position, the ECU 22 inputs into the transistor 42 via the drive terminal 40 a predetermined test drive signal St such that a current flowing in the linear solenoid 31b assumes a predetermined test current value It (constant value, for example, 0.4 A) within a predetermined interval (for example, 112 ms), finds a deviation ε between the real supplied current value Ir of the linear solenoid 31b detected by the sensor 32 at this time and the test current value It, and corrects the group of target drive signals So of the map M on the basis of this deviation ε (correction when movement is started). As described hereinabove, the test current value It (0.4 A) is a current value at which the transmission clutch 3 is in the connected state, but because the shift lever 21 is in the N or P position and the transmission T/M is in the neutral state, the drive power of the engine E is not transmitted to wheels. For this reason and also because the foot brake is actuated, the vehicle does not start moving.

During the very first shifting after the stopped vehicle has started moving, the ECU 22 inputs into the drive circuit C the target drive signal So corresponding to a complete disconnection of the transmission clutch 3 from the map M that was corrected when the vehicle started moving, performs disconnection control of the transmission clutch 3, disengages the present gear level (start gear level), engages the gears of the target gear level, then selects a target drive signal So according to a target supply current value Io (variable that changes with time and vehicle state) when the transmission clutch 3 is connection controlled from the group of target drive signals So of the map M that was corrected when the vehicle started moving, inputs the selected signal to the drive circuit C, and connection controls the transmission clutch 3. The above-described correction of the map M on the basis of the deviation ε that is performed in a stopped condition of the vehicle is performed each time the vehicle is in a stopped condition.

The vehicle speed is detected by a sensor measuring the revolution speed of the output shaft 9 of the transmission T/M. The foot brake actuation is detected by a switch that is switched ON when the foot brake is actuated, and the movement of the shift lever 21 into the N or P position is detected by a position sensor provided at the shift lever 21 or shift fork. The concept of N or P position of the shift lever 21 includes not only the transmission T/M and shift lever 21 having both the N position and the P position, but also the transmission T/M and shift lever 21 having only the N position or only the P position.

The operation of the present embodiment will be described below.

The connection-disconnection control of the transmission clutch 3 during shifting performed as the vehicle travels will be explained below using FIG. 4.

Figure 4:
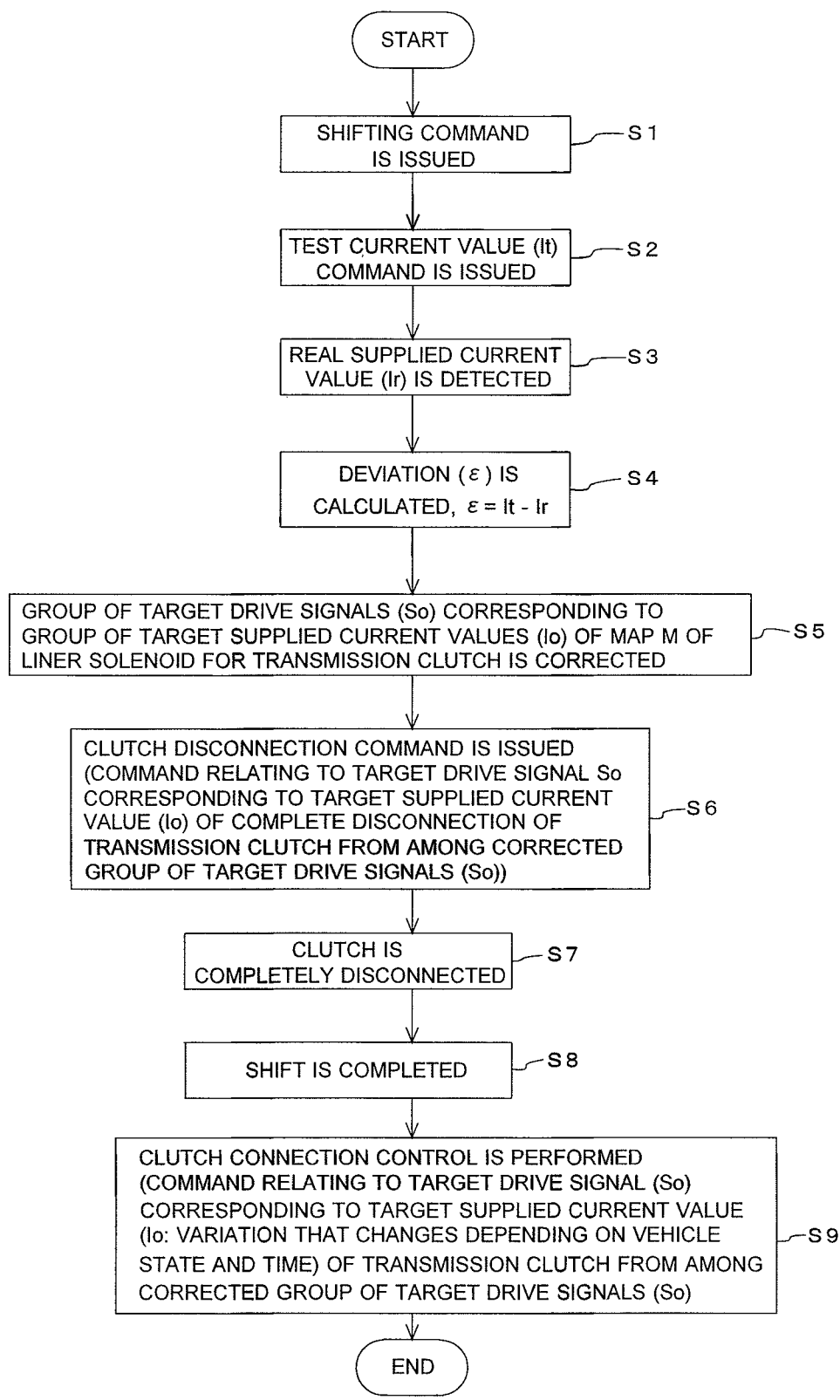
FIG. 4 is an explanatory drawing showing a flow of shifting with the transmission clutch control device of the present embodiment.

As shown in FIG. 4, the ECU 22 issues a shifting command (step S1) each time the transmission T/M is shifted in an automatic shifting mode or a manual shifting mode as the vehicle travels. A predetermined test drive signal St such that a current flowing in the linear solenoid 31b assumes a predetermined test current value (0.4 A) It within a predetermined interval (112 ms) before the transmission clutch 3 is disconnected to disengage gears for shifting is inputted to the drive circuit C (step S2).

After step S2, the real supplied current value Ir of the linear solenoid 31b is detected by the sensor 32 (step S3), a deviation δ between the detected real supplied current value Ir and the test current value It is found (step S4), and the group of target drive signals So of the map M is corrected on the basis of this deviation ε (step S5). For example, when the deviation ε is more than zero, a correction of adding the deviation ε to the group of target drive signals So is performed (when ε>0, So+ε), when the deviation ε is less than zero, a correction of subtracting the deviation ε from the group of target drive signals So (when ε<0, So−ε) is performed, and when the deviation ε is zero, the group of target drive signals So is not corrected.

After the group of target drive signals So of the map M has been corrected in step S5, the ECU 22 issues a disconnection command for the transmission clutch 3 for shifting and inputs a target drive signal So corresponding to the complete disconnection of the transmission clutch 3 from among the signals of the map M to the drive circuit C (step S6). The transmission clutch 3 is then completely disconnected (step S7), and transmission shifting, that is, "disengaging of gears of the present gear level and engaging to the shift gear level" is completed in this state (step S8).

After the engaging of gears in step S8, the ECU 22 performs connection control of the transmission clutch 3 (step S9). In this case the electronic control unit selects the target drive signal So corresponding to a target supplied current value Io (variable that changes depending on time and vehicle state) during connection control of the transmission clutch 3 from among the group of target drive signals So of the map M after the correction, inputs this target drive signal to the drive circuit C, and performs connection control of the transmission clutch 3.

The map M having written therein the new group of target drive signals So after correction that have been corrected in step S5 is held till the next time the shifting is performed or the vehicle is in a stopped condition. When the next shifting is performed, the above-described operations are performed, and when the vehicle is in a stopped condition, the map is updated to new values as will be described below.

As described hereinabove, with the control device of the transmission clutch 3 of the present embodiment, the map M for connection-disconnection control of the transmission clutch 3 is corrected from the deviation ε before the disconnection control of the transmission clutch 3 is executed by using a shift command as a trigger and the subsequent shift control of clutch disconnection-shift completion-clutch connection is executed according to the map M that has been corrected immediately before this control.

As a result, even when the value Ir of the real supplied current that actually flows in the linear solenoid 31b shifts with respect to the target supplied current value Io to the linear solenoid 31b due to variations in temperature or variations in voltage of the battery 43 as the vehicle travels, this shift can be corrected. Therefore, the transmission clutch 3 can be appropriately connection-disconnection controlled, including the half clutch state.

For example, it is possible to consider a case in which although the ECU 22 inputs the target drive signal So corresponding to a half clutch state to the drive circuit C, the value Ir of the real supplied current that actually flows in the linear solenoid 31b takes a value such that the half clutch state is not assumed, and a case in which although the ECU 22 inputs the target drive signal So corresponding to a state other than a half clutch state to the drive circuit C, the value Ir of the real supplied current that actually flows in the linear solenoid 31b takes a value such that the half clutch state is assumed due to variations in temperature or variations in voltage of the battery 43. In such cases, the appropriate connection-disconnection control of the transmission clutch 3 is impossible, the driver feels very uncomfortable, friction endurance of the transmission clutch is degraded, and endurance of transmission components is degraded (where shifting is performed in a half clutch state, although the clutch has to be disconnected, a gear noise is produced).

With the present embodiment, even when the above-described cases are encountered, the target drive signal So such that a current flowing in the linear solenoid 31b becomes the test current value It is inputted to the drive circuit C immediately before the transmission clutch 3 is disconnected for shifting each time shifting is performed, the value Ir of the real supplied current that actually flows in the linear solenoid 31b in this case is found, the map M is corrected based on the deviation ε between the real supplied current value Ir and the test current value It, the transmission clutch 3 is disconnection controlled based on the corrected map M after the correction, and the transmission clutch 3 is connection controlled based on the corrected map M after the gears have been disengaged and engaged, whereby the transmission clutch 3 can be appropriately connection-disconnection controlled all the time, including the half clutch state.

Furthermore, because the test current value (0.4 A) It is a current value at which the transmission clutch 3 does not assume a half clutch state and the connection state is maintained, when the ECU 22 issued a shift command as the vehicle travels (step S1 in FIG. 4), the transmission clutch 3 is not disconnected, the drive power is not cut off, and the driver does not feel uncomfortable.

The connection-disconnection control of the transmission clutch 3 performed when the vehicle is in a stopped condition will be described below.

When the vehicle is in a stopped condition, that is, when the vehicle speed is equal to or less than a predetermined speed (for example, 5 km/h), the foot brake is actuated, and the shift lever 21 is in an N or P position, the ECU 22 inputs a predetermined test drive signal St such that a current flowing in the linear solenoid 31b assumes a predetermined test current value It (constant value, for example, 0.4 A) within a predetermined interval (for example, 112 ms) to the transistor 42 via the drive terminal 40, finds the deviation ε between the value Ir of the real supplied current of the linear solenoid 31b detected by the sensor 32 at this time and the test current value It, and corrects the group of target drive signals So of the map M on the basis of this deviation ε.

The map M into which the new corrected target drive signals So have been written is held till the initial shifting is performed after the vehicle starts moving and the map is updated to new values as described hereinabove by using FIG. 4 when this shifting is performed. When the vehicle is stopped without shifting after the vehicle started moving, the corrected map M is held till the vehicle is in a stopped condition and the map is updated as described hereinabove when the vehicle is in a stopped condition.

As a result, even when the value Ir of the real supplied current that actually flows in the linear solenoid 31b shifts with respect to the target supplied current value Io to the linear solenoid 31b due to variations in temperature or variations in voltage of the battery 43 when the vehicle starts moving, this shift can be corrected. Therefore, the transmission clutch 3 can be appropriately connection-disconnection controlled, including the half clutch state.

The present invention is not limited to the above-described embodiment and a variety of other embodiments can be employed.

For example, the test current value It of 0.4 A and the predetermined time of 112 ms are presented by way of example and other values may be used.

Furthermore, in the present embodiment, the test current value It (0.4 A) in a stopped condition of the vehicle and the test current value It (0.4 A) during shifting performed when the vehicle travels are identical values such that the transmission clutch 3 maintains the connected state, but it is also possible that only the test current value It during vehicle stop be the value (for example, 0.8 A corresponding to complete disconnection) ensuring that the transmission clutch 3 maintains the disconnected state. As a result, it is possible to prevent completely the occurrence of engine stall or unintentional movement of the vehicle when the vehicle is stopped.

Thus, when an N or P position signal of the shift lever 21 obtained from the position sensor provided at the transmission T/M is an erroneous signal and actually a gear-in state is assumed (malfunction of the position sensor) and when a brake signal obtained from a brake switch provided at the foot brake is an erroneous signal and actually the foot brake is not stepped on (incorrect actuation of the brake switch) in a stopped state of the vehicle, where the test current value It is taken such that the transmission clutch 3 assumes the connected state and the transmission clutch 3 is in the connected state, the unexpected events, such as engine stall or vehicle movement due to creep of the fluid coupling (torque converter) 2, occur, but such events can be avoided by taking such a test current value It at which the transmission clutch 3 maintains the disconnected state.

Furthermore, in the configuration shown in FIG. 1, the fluid coupling 2 may be omitted and only the transmission clutch 3 may be interposed between the engine E and the transmission T/M, and the vehicle movement may be started by gradually connecting the transmission clutch 3 from the disconnected state. In this case, because the transmission clutch 3 is disconnected in a stopped condition of the vehicle, the test drive signal St inputted to the drive circuit C in a stopped condition of the vehicle is set to a value (for example, 0.8 A corresponding to complete disconnection) such that the transmission clutch 3 is disconnected.

Furthermore, the present invention is also applicable to a transmission T/M that has only one of the above-described automatic shifting mode and manual shifting mode.

What is claimed is:

1. A transmission clutch control device for connection-disconnection control of a transmission clutch interposed between an engine and a transmission and actuated by a fluid pressure, comprising:

a linear solenoid valve that is provided in a pipe, the pipe for supplying the fluid pressure to the transmission clutch and the linear solenoid valve having an opening degree that changes according to a supplied current value; a drive circuit that changes the supplied current value in response to an inputted drive signal; control means for storing a group of target drive signals, the inputted drive signal being selected from the group of target drive signals and inputted to the drive circuit when the transmission clutch is connected and disconnected; and a sensor that detects a value of a real supplied current flowing in the linear solenoid valve, wherein the control means is adapted to: input to the drive circuit a predetermined test drive signal as the inputted drive signal such that a current flowing in the linear solenoid valve assumes a predetermined test current value before the transmission clutch is disconnected for shifting during shifting of the transmission; obtain a deviation between the value of the real supplied current actually flowing in the linear solenoid valve that is detected by the sensor and the predetermined test current value; correct the group of target drive signals on the basis of the deviation; perform disconnection control of the transmission clutch by using the corrected group of target drive signals; and perform connection control of the transmission clutch by using the corrected group of target drive signals after one or more gears of the transmission have been disengaged and engaged.

2. The transmission clutch control device according to claim 1, wherein the test current value is set to a current value at which the transmission clutch maintains a connected state, without assuming a half clutch state.

3. A transmission clutch control device for connection-disconnection control of a transmission clutch interposed between an engine and a transmission and actuated by a fluid pressure, comprising:

a linear solenoid valve that is provided in a pipe, the pipe for supplying the fluid pressure to the transmission clutch and the linear solenoid valve having an opening degree that changes according to a supplied current value; a drive circuit that changes the supplied current value in response to an inputted drive signal; control means for storing a group of target drive signals, the inputted drive signal being selected from the group of target drive signals and inputted to the drive circuit when the transmission clutch is connected and disconnected;

and a sensor that detects a value of a real supplied current flowing in the linear solenoid valve, wherein the control means is adapted to: input to the drive circuit a predetermined test drive signal as the inputted drive signal such that a current flowing in the linear solenoid valve assumes a predetermined test current value in a stopped condition of a vehicle; obtain a deviation between the value of the real supplied current actually flowing in the linear solenoid valve that is detected by the sensor and the predetermined test current value; correct the group of target drive signals on the basis of the deviation; and perform connection-disconnection control of the transmission clutch by using the corrected group of target drive signals.

4. The transmission clutch control device according to claim 3, wherein the test current value is set to a current value at which the transmission clutch assumes a disconnected state.

\* \* \* \* \*